Jan. 19, 1932.   H. B. SOULEN   1,841,649
SIDE DRIVING BELT
Filed July 30, 1928

INVENTOR.
HARRY B. SOULEN.
BY
ATTORNEY.

Patented Jan. 19, 1932

1,841,649

UNITED STATES PATENT OFFICE

HARRY B. SOULEN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

SIDE DRIVING BELT

Application filed July 30, 1928. Serial No. 296,199.

My invention relates to belts and belting formed of rubber reinforced with cords or square woven fabric or both, particularly to belts of this character which are endless in form and of the side driving type. It is an object of my invention to provide a belt of increased durability, strength and flexibility. Other and more specific objects will be apparent from the following specification and claims.

In the accompanying drawings which illustrate one embodiment of my invention,

Figure 1:
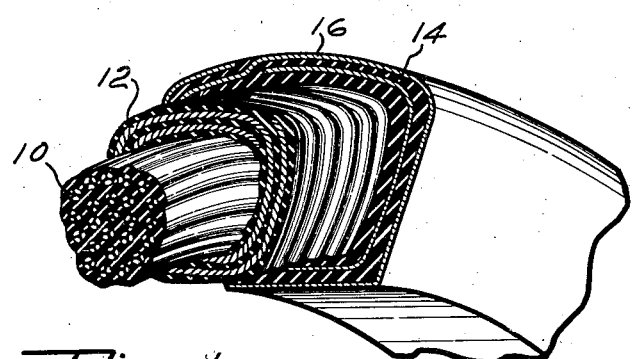
Fig. 1 is a perspective view, with parts broken away, of a section of an endless belt constructed according to my invention, the size of the elements being exaggerated in the interest of clearness.

Referring to the drawings, 10' designates the central core of the belt which is formed of rubberized cords 10. In the form shown the core comprises a plurality of rubberized cords positioned longitudinally of the belt and substantially parallel to each other. If preferred the core may take the form of a twisted or braided cord cable or a plurality of convolutions of a single cord. The core is transversely wrapped with a plurality of rubberized cords 12, the cords 12 being substantially at right angles to the core 10'. This cord wrapping forms an important element of my improved belt construction. As will be clear, each cord 12 forms a separate spiral about the core and lies as nearly in a plane at right angles to the core 10' as building conditions will permit. In other words, each cord 12 forms a substantially concentric spiral. The adjacent spirals are held together by the yielding rubber which surrounds them which is free to yield as the belt rounds the pulley without imposing strain on the spirally positioned cords with the result that the wrapping cords are not fatigued by a rapid succession of conditions of strain and relief as is the case where a bias arrangement of cords or threads is used. The outer portion of the belt is formed by alternate layers or convolutions of rubber 14 and a relatively open square woven bias cut fabric 16. The rubber portions 14 may be conveniently provided as a heavy rubber coating on one or both sides of the fabric 16.

Figure 2:
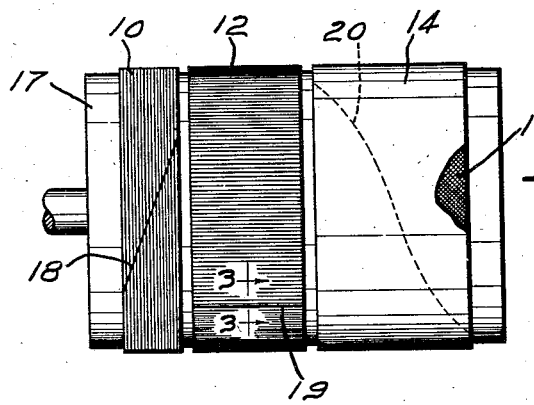
Fig. 2 is a view illustrating one manner of forming the belt.
Figure 3:
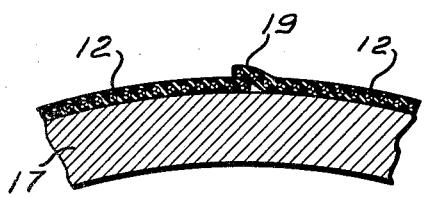
Fig. 3 is a sectional view substantially on line 3—3 of Fig. 2, showing the initial relation of the wrapping cords at the splice.
Figure 4:
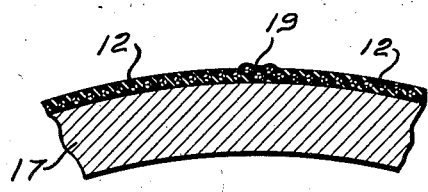
Fig. 4 is a similar view showing the relation of the cords after the splice has been rolled down but prior to vulcanization.

While the belt of my invention may be built up in various ways I prefer the method illustrated in Fig. 2. As shown in this figure, I lay the core cords 10 in the form of a rubberized sheet of cord fabric, preferably without weft threads, about a drum 17, the cords running circumferentially of the drum. The ends of the sheet of cords 10 are preferably cut at an angle to the sheet to form a bias lap joint as indicated at 18. Adjacent to lap joint as indicated at 18. Adjacent to lap joint as indicated at 18. Adjacent to cords 10 on the drum I lay the wrapping cords 12 in the form of a rubberized sheet of cords, which may be similar to the sheet used for the core, the cords of sheet 12 laying longitudinally of the drum and at right angles to cords 10. A further advantage obtained by the laying of the wrapping cords at right angles to the core cords is found in the formation of the lap joint 19 of the ends of the sheet 12 as illustrated in Figs. 3 and 4. Since the lap is parallel to the cords instead of on the bias the cords at the lap take the general position shown in Fig. 3 and when rolled or stitched down the overlying cords are partially crowded in between the underlying cords as indicated in Fig. 4. When the belt is finally vulcanized under pressure the overlying cords crowd completely in between the underlying cords with the result that a uniform thickness of wrapper is obtained throughout the belt, the double thickness which results when a bias cut fabric is lapped being eliminated. Adjacent cords 12 on drum 17 I lay a sheet of square woven bias cut fabric 16 carrying the cushion rubber 14 in the form of a heavy rubber coating on its upper side. The ends of sheet 14—16 are joined in a bias lap as indicated at 20. Starting at the left hand edge of the sheet of cords 10, as viewed in Fig. 2, the sheet is rolled upon itself and successively into the sheet of wrapper cords 12 and the rubber coated bias cut square woven fabric sheet 16. This general method of rolling annular belts, being well known, needs no further description and it will be understood that my invention is not limited to its use.

While I have shown the wrapping 12 formed from a sheet of cords held together by rubber alone, a sheet of cords having a so-called rotten weft may be used in which case the cord spirals around the core would be initially joined by the rotten weft threads. In use these weft threads will presumably break leaving the spirals joined only by the surrounding rubber. In any event the weft threads will not be strong enough to transmit a substantial strain to the spirally positioned cords and while I prefer to have the transverse cords 12 to be free of weft threads, the use of a sheet of cords provided with such threads would be within the scope of my invention.

The spacing of cords 10 from each other in part determines the proportion of rubber to cords in the core and I find that a sheet of cords spaced 24 or 26 to the inch gives satisfactory results. This same spacing may be used for cords 12 but I prefer to space the latter cords 15 or 18 to the inch.

Figure 5:
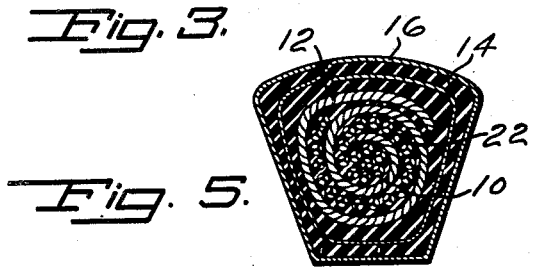
Fig. 5 is a section showing a modified form of my belt.

In Fig. 5 I have shown a modified form of belt in which cords 22 parallel to the cords of the core have been positioned within the convolutions of the spirals formed by cords 12. The addition of cords 22 permits a reduction in the size of the core and, while leaving the separate spirals unconnected since cords 22 are imbedded in the surrounding rubber without contacting with cords 12, distribute the tensile strains through a greater portion of the belt section. The arrangement shown in Fig. 5 may be conveniently secured by lapping sheet 12 in Fig. 2 over substantially two thirds of sheet 10.

Having thus described my invention, I claim:

1. A vulcanized side driving belt comprising a cord core and a plurality of rubberized cords forming individual, substantially concentric spirals about the core, the succeeding convolution of each individual spiral being separated from its preceding convolution only by the intervening rubber and the adjacent spirals being unconnected except for the surrounding rubber.

2. A vulcanized side driving belt comprising a core of rubberized cords running longitudinally of the belt and a plurality of rubberized cords, wound at substantially right angles about the core in a plurality of substantially concentric convolutions, forming individual spirals about the core, the succeeding convolution of each individual spiral being separated from its preceding convolution only by the intervening rubber and the adjacent spirals being unconnected except for the surrounding rubber.

3. A vulcanized side driving belt comprising a core of rubberized cords running longitudinally of the belt, a plurality of rubberized cords, wound at substantially right angles about the core in a plurality of substantially concentric convolutions, forming individual spirals about the core, the succeeding convolution of each individual spiral being separated from its preceding convolution only by the intervening rubber and the adjacent spirals being unconnected except for the surrounding rubber, and an outer covering of rubberized bias cut square woven fabric.

HARRY B. SOULEN.